United States Patent
Ahmed et al.

(10) Patent No.: US 7,167,852 B1
(45) Date of Patent: Jan. 23, 2007

(54) SYSTEMS AND METHODS FOR INCREASING ALLOWABLE JOIN ORDERS IN QUERY OPTIMIZATION

(75) Inventors: Rafi Ahmed, Fremont, CA (US); Hakan Jakobsson, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 464 days.

(21) Appl. No.: 10/137,102

(22) Filed: May 1, 2002

(51) Int. Cl.
G06F 17/30 (2006.01)
G06F 9/44 (2006.01)

(52) U.S. Cl. .............................. 707/1; 707/3; 717/114

(58) Field of Classification Search .............. 707/1–3, 707/6–7; 717/100–101, 114
See application file for complete search history.

(56) References Cited

U.S. PATENT DOCUMENTS

2004/0039736 A1* 2/2004 Kilmer et al. .................. 707/3
2004/0103094 A1* 5/2004 Levy et al. ..................... 707/3

OTHER PUBLICATIONS

Becker, L. and R.H. Güting "Rule-Based Optimization and Query Processing in an Extensible Geometric Database System" *ACM Transactions on Database Systems* (Jun. 1992) 17(2):247-303.
Fegaras, L. and D. Maier "Optimizing Object Queries Using an Effective Calculus" *ACM Transactions on Database Systems* (Dec. 2000) 25(4):457-516.
Galindo-Legaria, C. and A. Rosenthal "Outerjoin Simplification and Reordering for Query Optimization" *ACM Transactions on Database Systems* (Mar. 1997) 22(1):43-74.
Haas, L.M. et al. "Extensible Query Processing in Starburst" *ACM SIGMOD Record*, Proceedings of the 1989 ACM SIGMOD Int'l Conference on Management of Data (Jun. 1989) 18(2):377-388.
Lieuwen, D.F. and D.J. DeWitt "A Transformation-Based Approach to Optimizing Loops in Database Programming Language" *ACM SIGMOD Record*, Proceedings of the 1992 ACM SIGMOD Int'l Conference on Management of Data (Jun. 1992) 21(2):91-100.
Mishra, P. and M.H. Eich "Join Processing in Relational Databases" *ACM Computing Surveys* (Mar. 1992) 24(1):65-113.
Muralikrishna, M. "Improved Unnesting Algorithms for Join Aggregate SQL Queries" Proceedings of the 18$^{th}$ VLDB Conference, Vancouver, British Columbia, Canada (1992) 91-102.
Seshadri, P. et al. "Cost-Based Optimization for Magic: Algebra and Implementation" *ACM SIGMOD Record*, Proceedings of the 1996 SIGMOD Int'l Conference on Management of Data (Jun. 1996) 25(2):435-446.
Steinbrunn, M. et al. "Heuristic and randomized optimization for the join ordering problem" *The VLDB Journal* (Aug. 1997) 6(3):191-208.

\* cited by examiner

*Primary Examiner*—Alford W. Kindred
(74) *Attorney, Agent, or Firm*—Bingham McCutchen LLP

(57) ABSTRACT

Statements having non-commutative connection conditions are optimized by replacing the non-commutative connection conditions with equivalent expressions that allow for consideration of additional connection orders that would otherwise violate the ordering rules of the non-commutative connection condition. Elements on the right-hand side of a non-commutative connection condition are converted into distinct results elements, thereby allowing the elements to be used on the left-hand side of a commutative connection operator, while preserving accuracy of the statement results set. This increased set of connection orders is evaluated and the execution plan for the optimal connection order is selected.

27 Claims, 4 Drawing Sheets

VALUES IN T2.z AND T3.z

| T2.z | T3.z |
|------|------|
| 1    | 1    |
| 2    | 1    |
|      | 2    |
|      | 2    |

T2.z S = T3.z

SEMI-JOIN RETURNS 2 ROWS

SORT UNIQUE (T3.z) = T2.z

JOIN RETURNS 2 ROWS

VALUES IN T1.x AND T2.x
| T1.x | T2.x |
|------|------|
| 1    | 1    |
| 2    | 1    |
|      | 2    |
|      | 2    |
*FIG. 1A*
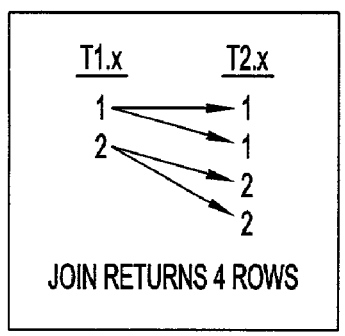
T1.x = T2.x
JOIN RETURNS 4 ROWS
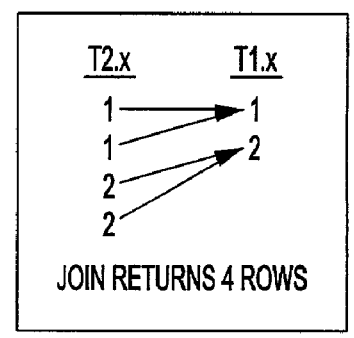
T2.x = T1.x
JOIN RETURNS 4 ROWS
*FIG. 1B*
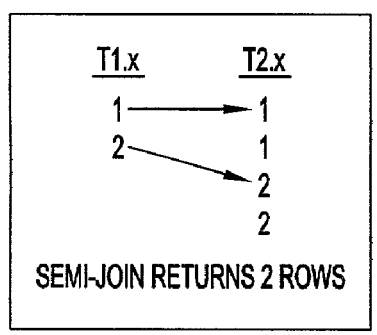
T1.x S = T2.x
SEMI-JOIN RETURNS 2 ROWS
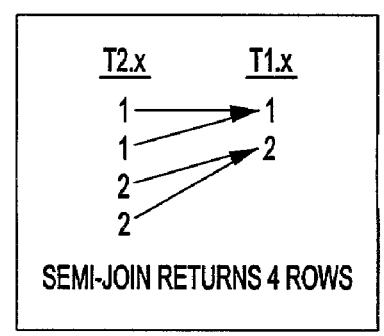
T2.x S = T1.x
SEMI-JOIN RETURNS 4 ROWS
*FIG. 1C*

SYSTEMS AND METHODS FOR INCREASING ALLOWABLE JOIN ORDERS IN QUERY OPTIMIZATION

FIELD OF THE INVENTION

The invention relates to the field of computer systems, and more particularly to methods of optimizing database operations.

BACKGROUND

Modern database management systems (DBMS) process ever-increasing amounts of data. These database systems can store millions of data records. When accessing large databases, it is important to minimize the amount of time the database access takes, to ensure efficient and speedy operation of the database management system. Most large-scale database management systems use some form of optimization scheme, to ensure that operations executed on the DBMS, such as database queries, are executed as efficiently as possible.

In a database management system, optimization is the process of choosing an efficient way to execute a database query or manipulation action. Examples of such query or manipulation actions include searching, retrieving, modifying, organizing, adding, and/or deleting information from the database. These database query/manipulation actions are normally initiated by submitting statements to a database server using a language adapted to facilitate information storage and retrieval. One popular such language is known as Structured Query Language ("SQL"). For the purposes of explanation only, and not by way of limitation, the following description is made with reference to SQL statements.

To execute a SQL statement, the database system may have to perform steps involving the retrieval or manipulation of data from various database structures, such as tables and indexes. Often, there exists many alternate ways to execute the SQL statement and many alternative execution orders for the steps. For example, a single SQL statement can be executed in different ways by varying the order in which tables and indexes are accessed to execute the statement. The exact combination and execution order of steps taken to execute the SQL statement can drastically change the efficiency or speed of execution for the statement. The combination and execution order of steps that are used to execute a SQL statement is referred to as an "execution plan."

As an example, consider the following SQL statement, which queries for the name of all employees having a salary equal to 100 from a database table "emp_able":

SELECT employee_name
FROM emp_table
WHERE salary=100

A first execution plan could include the step of performing a full table scan of emp_table to execute the query. This first execution plan would retrieve every row from emp_table to identify particular rows that match the WHERE clause. Alternatively, if an index exists for the "salary" column of emp_table, then a second execution plan could involve accessing the index to identify rows that match the WHERE clause, and thereafter retrieving only those identified rows from the table. The index is considered an alternate access path to the data sought by the SQL statement.

An "optimizer" is used by a database system to choose what is believed to be the most efficient execution plan for a SQL statement. The optimizer typically generates a set of potential execution plans for the SQL statement based upon available access paths for the data sought to be operated upon by that statement. The optimizer then chooses the optimal execution plan from amongst the generated set.

When optimizing a query referencing more than one table, one type of execution order the optimizer considers in searching for the optimal execution plan is connection ordering. Connection ordering is the sequence in which tables are connected together to generate the composite table on which the query will be executed. Using SQL, tables can be connected using a variety of different connection conditions, including joins and sub-queries.

The general format of a connection condition includes a left-hand element, a connection operator, and a right-hand element. The connection operator connects the left-hand element to the right-hand element, based on values contained in the two elements. The elements can include table columns, constants, SELECT statements or other expressions useful to connect tables or other database components together.

Connection operators can be operators provided as primitive operations in SQL, such as the join ("="), EXISTS, ANY, and IN operators. Connection operators can also be operators used internally by the DBMS in evaluating SQL primitives, such as the semi-join ("S=") operator, or the filter operator. One common use of semi-joins and filters is in evaluating SQL sub-queries.

Among the basic types of connection operators are commutative connection operators and non-commutative connection operators. Commutative connection operators such as produce the same composite table regardless of whether the first connection column appears on the left-hand side of the connection operator or the right-hand side. For example, the "=" join operator instructs the query to return a row in the composite table for each instance where the value in the left-hand join column equals the value in the right-hand join column.

Turning to FIGS. 1A–1C, a first table T1 includes a first join column T1.x. The first join column T1.x contains two rows, having the values "1" and "2". A second table T2 includes a second join column T2.x. The second join column T2.x contains four rows, having the values "1", "1", "2" and "2". As shown in FIG. 1B, using the example join columns of FIG. 1A, the join condition T1.x T2.x will produce the same composite table as the join condition T2.x=T1.x. Both join conditions return four rows, as shown by the arrows joining the rows of T1.x and T2.x.

Non-commutative connection operators such as EXISTS, IN, ANY, S= and filters, however, produce different composite tables depending on the ordering of the connection columns. For example, the "S=" semi-join operator instructs the query to return a row in the composite table if there is at least one instance where a value for the right-hand semi-join column matches the value in the left-hand semi-join column. Note that "S=" is used here as a shorthand notation for the semi-join operator, and is not a standard SQL operator notation. This operator will only return one row, no matter how many matches are found in the right-hand semi-join column. As shown in FIG. 1C, using the example semi-join columns of FIG. 1A, the semi-join condition T1.x S=T2.x produces a different result set than the semi-join condition T2.x S=T1.x. The two semi-join conditions return two and four rows respectively, as shown by the arrows joining the rows of T1.x and T2.x.

For an example of connection ordering using joins, assume a query having three tables contains the following join conditions:

T1.x=T2.x (join rows in T1 with rows in T2 where
 column T1.x equals column T2.x)

T2.y=T3.y (join rows in T2 with rows in T3 where
 column T2.y equals column T3.y)

When executing a query with these join conditions, the DBMS has several options as to the order in which it will join these tables. For example, the DBMS could start with T1, and join in the rows from T2 that satisfy the join condition T1.x=T2.x. The DBMS would then join the rows from T3 into the T1, T2 composite table according to the join condition T2.y=T3.y. This join order is expressed as T1 |x| T2 |x| T3. There are other connection orders that are possible, a shown in Table 1.

TABLE 1

3-table connection orders

T1 |x| T2 |x| T3
T1 |x| T3 |x| T2
T2 |x| T1 |x| T3
T2 |x| T3 |x| T1
T3 |x| T2 |x| T1
T3 |x| T1 |x| T2

Each of these connection orders carries a cost, possibly different from the other connection orders. When the optimizer generates the set of potential execution plans, the optimizer considers each connection order, and selects the connection order that yields the optimal execution plan.

In the above example, since the join operators are all commutative, the optimizer is able to consider all of the possible connection orders for the tables in the query. However, if a query contains a non-commutative connection operator, then some of the possible connection orders are unavailable, because they violate the ordering requirements of the non-commutative connection operator.

For example, consider the following connection conditions:

T1.x S=T2.x

T1.y=T3.y

Since the semi-join condition T1.x S=T2.x is non-commutative, the optimizer cannot consider any connection orders that would connect T2 into the composite table before T1, because this would violate the ordering requirements of the S=semi-join operator. The decreased set of available connection orders is shown in Table 2 below, with the unavailable connection orders crossed out:

TABLE 2

3-table connection orders

T1 |x| T2 |x| T3
T1 |x| T3 |x| T2
T3 |x| T1 |x| T2

Queries containing subquery filters also limit the connection orders available for consideration by the optimizer. Using the following query as an example:

SELECT T1.n

FROM T1, T2

WHERE T1.y=ANY (SELECT T3.y FROM T3 RE T2.z=T3.z)

AND T1.k=T2.k;

This query contains a subquery. If the subquery is evaluated as a filter, it is applied to each row in the composite table created by the join of T1 and T2. In order to computer whether the subquery evaluates to TRUE or FALSE for that row, the values for both T1.y and T2.z need to be available. Therefore, the evaluation of the subquery as a filter cannot take place until after T1 and T2 have been joined. Hence, evaluating subqueries as filters restricts the possible orderings of operations in a multi-table query.

Note that the above query references a total of three tables, T1 and T2 in the main query, and T3 in the subquery. Thus, the theoretical maximum number of connection orders is 3!, or six, as discussed above. However, with the subquery requiring the values T1.y and T2.z prior to being evaluated, the optimizer is limited in how it can consider connections on T3. While the optimizer can connect T1 and T2 in either order, since the join condition T1.k=T2.k is commutative, it must connect T1 and T2 prior to evaluating the subquery. This yields the two available connection orders shown in Table 3 below.

TABLE 3 subquery connection orders

T1 |x| T2 |x| subquery
T2 |x| T1 |x| subquery

This is fewer connection orders than the theoretical maximum of six connection orders discussed above.

The presence of a non-commutative connection condition prevents the optimizer from considering all possible connection orders for the tables in the query, and thus limits the efficiency of the optimization of the query. Additionally, the presence of a filter in the query prevents the optimizer from considering all possible connection orders for the tables in the query. Therefore, systems and methods are needed to enhance the efficiency of the optimizer by allowing for consideration of more potential execution plans for queries having non-commutative connection conditions and/or filters.

SUMMARY OF THE INVENTION

Systems and methods of embodiments of the invention increase the number of connection orders available for consideration by the optimizer. The accuracy of the optimizer is improved by allowing for consideration of more potential connection orders.

In an aspect of an embodiment of the invention, a non-commutative connection operator is replaced with a connection operator that allows additional connection orders to be considered by the optimizer.

In another aspect of an embodiment of then invention, a sub-query is unnested into a connection condition, to allow additional connection orders to be considered by the optimizer.

BRIEF DESCRIPTION OF THE DRAWINGS

FIG. 1A depicts a pair of connection columns belonging to a pair of tables.

FIG. 1B depicts two commutative connections between the connection columns.

FIG. 1C depicts two non-commutative connections between the connection columns.

DETAILED DESCRIPTION OF THE PREFERRED EMBODIMENTS

Figure 2:
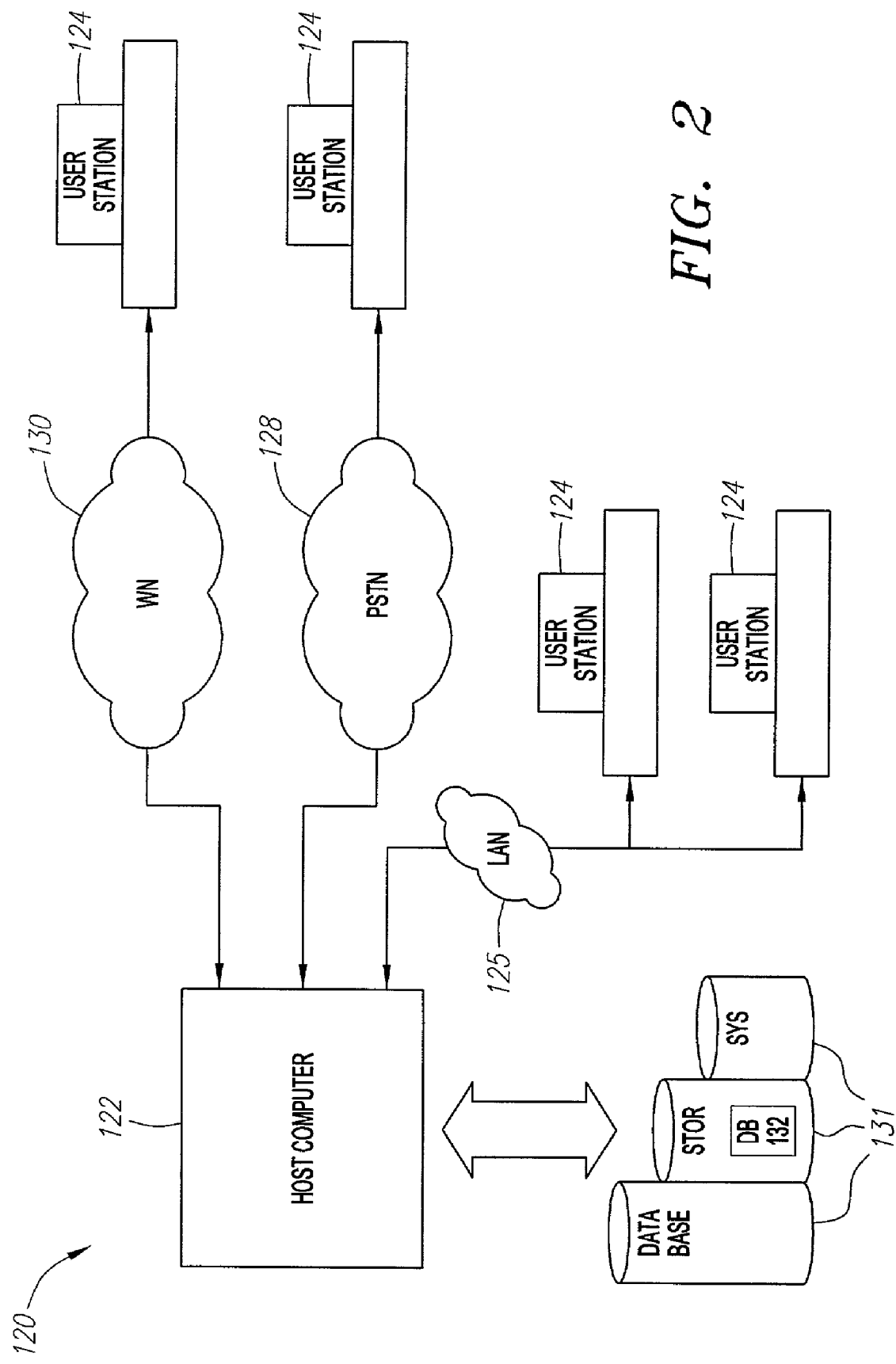
FIG. 2 is a representation of a computer system in accordance with an embodiment of the invention.

Referring to FIG. 2, a computer system 120 constructed in accordance with one preferred embodiment of the present invention includes a host computer 122 connected to a plurality of individual user stations 124. The user stations 124 each comprise suitable data terminals, such as, e.g., personal computers, portable laptop computers, or personal data assistants ("PDAs"), which can store and independently run one or more applications, i.e., programs. For purposes of illustration, some of the user stations 124 are connected to the host computer 122 via a local area network ("LAN") 125. Other user stations 124 are remotely connected to the host computer 122 via a public telephone switched network ("PSTN") 128 and/or a wireless network 130.

The host computer 122 operates in conjunction with a data storage system 131, which contains a database 132 that is readily accessible by the host computer 122. In alternative embodiments, the database 132 may be resident on the host computer, stored, e.g., in the host computer's ROM, PROM, EPROM, or any other memory chip, and/or its hard disk. In yet alternative embodiments, the database 132 may be read by the host computer 122 from one or more floppy disks, flexible disks, magnetic tapes, any other magnetic medium, CD-ROMs, any other optical medium, punchcards, papertape, or any other physical medium with patterns of holes, or any other medium from which a computer can read. In further alternative embodiments, the host computer 122 can access two or more databases 132, stored in a variety of mediums, as previously discussed.

Figure 3:
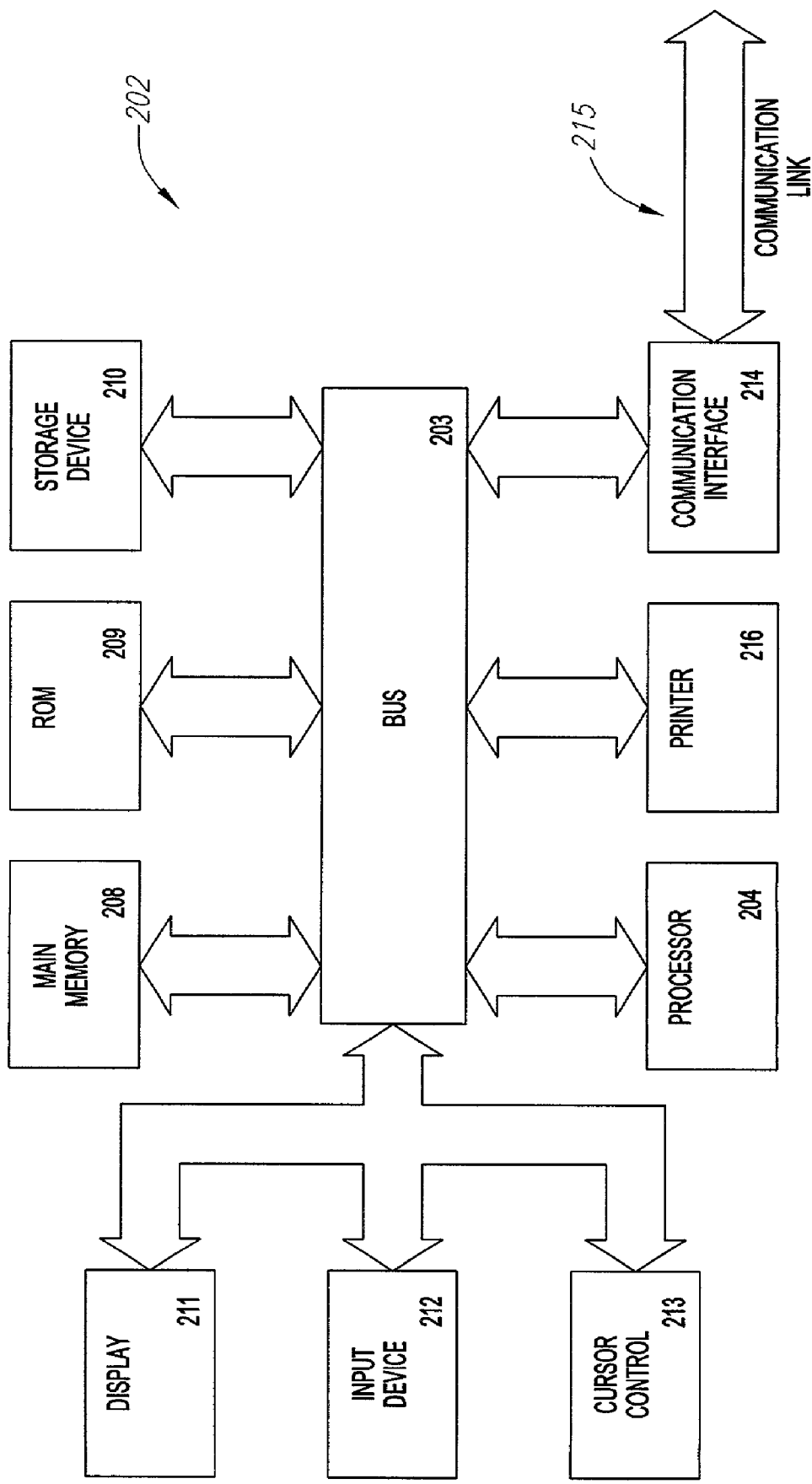
FIG. 3 is a representation of a processing unit used in the computer system of FIG. 1.

Referring to FIG. 3, each user station 124 and the host computer 122 can be referred to generally as a processing unit 202. The processing unit 202 includes a bus 203 or other communication mechanism for communicating instructions, messages and data, collectively, information, and one or more processors 204 coupled with the bus 203 for processing information. The processing unit 202 also includes a main memory 208, such as a random access memory (RAM) or other dynamic storage device, coupled to the bus 203 for storing dynamic data and instructions to be executed by the processor(s) 204. The main memory 208 also may be used for storing temporary data, i.e., variables, or other intermediate information during execution of instructions by the processor(s) 204.

The processing unit 202 further includes a read only memory (ROM) 209 or other static storage device coupled to the bus 203 for storing static data and instructions for the processor(s) 204. A storage device 210, such as a magnetic disk or optical disk, is also provided and coupled to the bus 203 for storing data and instructions for the processor(s) 204. An output device such as a printer 216 is also provided and coupled to the bus 203, for outputting information to the user.

The processing unit 202 is also coupled via the bus 203 to a display device 211, such as, but not limited to, a cathode ray tube (CRT), for displaying information to a user. An input device 212, including alphanumeric and other keys, is coupled to the bus 203 for communicating information and command selections to the processor(s) 204. Another type of user input device may include a cursor control 213, such as, but not limited to, a mouse, a trackball, a fingerpad, or cursor direction keys, for communicating direction information and command selections to the processor(s) 204 and for controlling cursor movement on the display 211.

The individual processing units 202 perform specific operations by their respective processor(s) 204 executing one or more sequences of one or more instructions contained in the main memory 208. Such instructions may be read into the main memory 208 from another computer-usable medium, such as the ROM 209 or the storage device 210. Execution of the sequences of instructions contained in the main memory 208 causes the processor(s) 204 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 204. Such a medium may take many forms, including, but not limited to, non-volatile, volatile and transmission media. Non-volatile media, i.e., media that can retain information in the absence of power, includes the ROM 209. Volatile media, i.e., media that can not retain information in the absence of power, includes the main memory 208. Transmission media includes coaxial cables, copper wire and fiber optics, including the wires that comprise the bus 203. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 204 can retrieve information.

Various forms of computer-usable media may be involved in providing one or more sequences of one or more instructions to the processor(s) 204 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 203 may receive the infrared signals and place the instructions therein on the bus 203. The bus 203 may carry the instructions to the main memory 208, from which the processor(s) 204 thereafter retrieves and executes the instructions. The instructions received by the main memory 208 may optionally be stored on the storage device 210, either before or after their execution by the processor(s) 204.

Each processing unit 202 also includes a communication interface 214 coupled to the bus 203. The communication interface 214 provides two-way communication between the processing units 202 (such as, e.g., between a user station 124 and the host computer 122) via a communication link 215. The communication interface 214 of a respective processing unit 202 transmits and receives electrical, electromagnetic or optical signals that include data streams representing various types of information, including instructions, messages and data.

The communication link 215 may be a LAN 125, in which case the communication interface 214 may be a LAN card. Alternatively, the communication link 215 may be a PSTN 128, in which case the communication interface 214 may be an integrated services digital network (ISDN) card or a modem. In addition, as a further alternative, the communication link 215 may be a wireless network 130.

Each processing unit 202 transmits and receives messages, data, and instructions, including program, i.e., application, code, through its respective communication link 215 and communication interface 214. Received program code may be executed by the respective processor(s) 204 as it is received, and/or stored in the storage device 210, or other associated non-volatile media, for later execution. In this manner, a processing unit may receive messages, data and/or program code in the form of a carrier wave.

The computer system 120 runs a database management system (DBMS). The database management system is responsible for managing access to the database 132 by various entities, These entities include, for example, users of the host computer 122 or the user stations 124, or other computer programs running on the host computer 122 or the user stations 124. The entities access the database 132 by, for example, submitting SQL statements to the DBMS.

Figure 4:
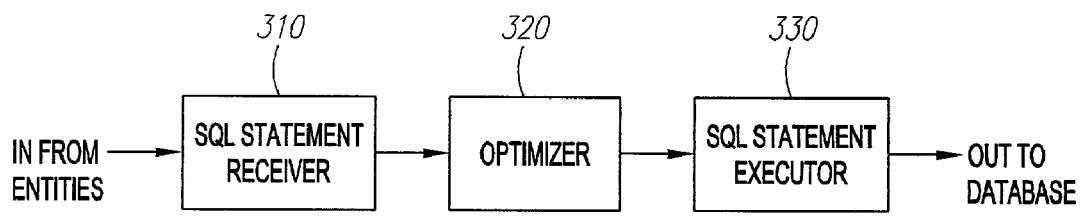
FIG. 4 is a representation of a system for optimizing a database operation.

Turning to FIG. 4, the DBMS includes a SQL statement receiver 310 that receives SQL statements from the entities, and passes the SQL statements to the optimizer 320. The DBMS further includes an optimizer 320, which optimizes the SQL statements prior to their being executed on the database 132. The DBMS further includes a SQL statement executor 330 that receives the optimized SQL statements from the optimizer and executes them on the data stored in the database 132.

Where the optimizer 320 optimizes a query, the execution plans generated by the optimizer 320 include one or more plan components that implement a connection order for the tables in the query. As discussed above, queries containing subqueries are limited in the connection orders available for consideration, when optimized using conventional methods.

For example, consider the query:

SELECT T1.n

FROM T1, T2

WHERE T1.y=ANY (SELECT T3.y FROM T3 WHERE T2.z=T3.z)

AND T1.k=T2.k;

This query requires the values T1.y and T2.z to be available prior to evaluating the subquery, thus only two of the six possible connection orders are available, as discussed above.

To increase the number of available connection orders for a query having a subquery, the subquery is unnested into a flattened query, by transforming the subquery into one or more connection conditions that produce an equivalent result set. The subquery is unnested by identifying any tables specified in the FROM clause of the subquery and moving them up into the main query, if they are not already present there. Then, the target of the SELECT statement of the subquery is included as a join condition in the main query. The conditions, including correlating conditions, in the WHERE clause of the subquery are combined with the conditions in the WHERE clause of the main query, to generate the same query results as the subquery. Thus the T3.y column is used to create the semi-join condition T1.y S=T3.y and the T3.z column is used to create the semi-join condition T1.z S=T3.z.

For some types of subqueries, such as EXISTS, IN or ANY subqueries, unnesting the subquery using the "=" join operator causes incorrect results to be returned. According to the semantics of the query, the rows from the join between T1 and T2 either match the subquery condition or they do not. If they match the subquery condition, they should be returned as the result of the query; otherwise not. However, according to the semantics of SQL, the same row from the join between T1 and T2 would never be returned as the result of the query more than once. A simple conversion to the "=" join operator could violate this rule since a simple join would return multiple rows from the join of T1 and T2 if there are multiple rows in T3 that match the subquery condition.

To insure that correct results are preserved when unnesting EXISTS, IN and ANY subqueries, the "S=" semi-join operator is used. Thus the example query above is unnested and transformed into the following:

SELECT T1.n

FROM T1, T2, T3

WHERE T1.y S=T3.y

AND T2.z S=T3.z

AND T1.k=T2.k;

If the unnested query contains non-commutative connection operators, then the methods discussed in more detail below are used to further increase the available connection orders for the query. For the example query above, in potential connection orders where T3 is connected before T1 or T2, the query is modified as discussed below, including replacing the semi-join operator S= is replaced with the join operator "=". This yields the increased set of connection orders discussed above in Table 1.

The query shown above, whether generated by unnesting a subquery as discussed above, by receiving the query directly from a user, or by any other means, is optimized as discussed below. When optimizing this query, the optimizer 320 generates a set of execution plans as discussed above. Each execution plan includes one or more plan components that create the connection order for the execution plan. For example, a first connection order for the query is:

T1⋈T2⋈T3.

As discussed above, the full set of possible connection orders for three tables is shown in Table 1. The set of available connection orders for the query, however, is limited by the presence of the non-commutative semi-join operator "S=". When the optimizer 320 creates an execution plan having a connection order that is not allowed by the ordering requirements of the non-commutative semi-join operator, the optimizer 320 replaces the semi-join operator with an equivalent connection for which the connection order is allowable. For example, with reference to the query above, the optimizer generates a connection order for a potential execution plan as follows:

T1⋈T3⋈T2.

Since the S= operator is non-commutative, this connection order is not allowed by the ordering requirements for the S= operator, because table T3 appears to the left of table T2. The optimizer 320 replaces the non-commutative S= operator with the join operator "=", which is commutative. This replacement allows the optimizer 320 to consider the connection orders which place T3 to the left of T2. However, the composite table for the semi-join T2.z S=T3.z will not always be the same as the composite table for the join T3.z=T2.z. Extra rows will be generated in the composite table for T3.z=T2.z, as compared with the composite table for T2.z S=T3.z, whenever there are duplicate values in the connection column for T3, T3.z. If the replacement composite table is different from the original composite table, then the optimization may cause an incorrect result set to be returned to the user.

To resolve this problem, in situations where the optimizer 320 is considering a connection order which places T3 on the left-hand side of the connection operator, the optimizer 320 creates an additional plan component for the execution plan under construction. This plan component includes an operation that causes the connection column T3.z to return only distinct (non-duplicative) values contained in the connection column. For example, the plan component specifies that a SORT UNIQUE operation is done on the connection column T3.z.

Thus, the join condition used by the optimizer is:

SORT UNIQUE(T3.z)=T2.z.

Figure 5:
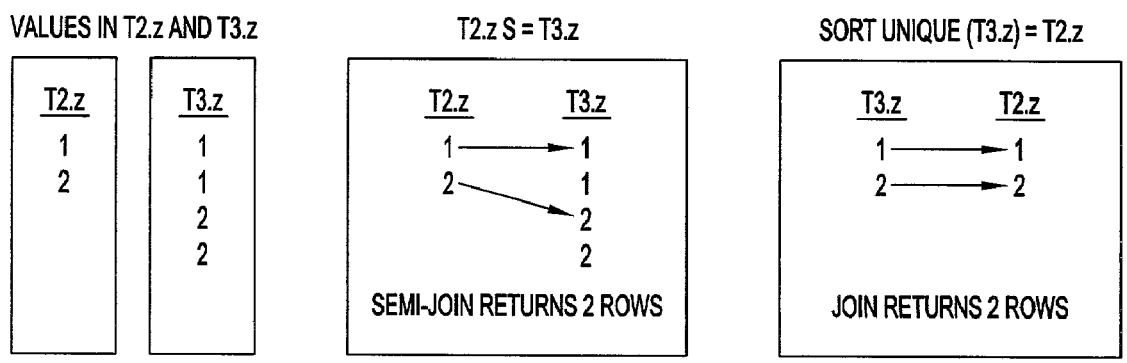
FIG. 5 depicts a non-commutative connection and an equivalent commutative connection between the connection columns of FIG. 1A.

This join condition generates the same composite table as the non-commutative semi-join condition T2.z S=T3.z, but the join condition allows T3 to appear on the left-hand side of the join, thereby allowing those connection orders having T3 to the left of T2 to be considered by the optimizer 320. FIG. 5 shows an example of the composite tables created by the SORT UNIQUE (T3.z) T2.z. and T2.z S=T3.z join conditions.

Where there is an additional execution cost incurred in replacing the non-commutative semi-join operator, this extra cost is included in the execution plan, and is factored into the optimizer's selection of the optimal execution plan. For example, assume the optimizer 320 calculates the cost of the connection order T1 ⋈ T2 ⋈ T3 for the above query to be 10 optimizer cost units ("OCU"). Further assume that the optimizer calculates the cost of the connection order T1 ⋈ SORT UNIQUE T3 ⋈ T2 to be 6 OCU, and the extra cost to do the SORT UNIQUE operation to be 7 OCU. This yields a total cost of 13 OCU for the T1 ⋈ SORT UNIQUE T3 ⋈ T2 join order. Therefore, the optimizer 320 selects the T1 ⋈ T2 ⋈ T3 connection order, since it has a lower total cost and is therefore optimal under the optimization scheme used in this example.

If, however, the table T3 is known to contain unique values in the join column T3.z, then the extra cost of doing the SORT UNIQUE is avoided. Similarly, if the final result of the SELECT statement will return distinct values, then the SORT UNIQUE is unneeded, since the duplicate rows will be eliminated before the results are returned to the user. Under these conditions, the SORT UNIQUE operation will not be included in the execution plan. The optimizer 320 therefore generates the connection order T1 ⋈ T3 ⋈ T2 and computes the cost of this connection order. If T1 ⋈ T3 ⋈ T2 has a lower cost than T1 ⋈ T2 ⋈ T3 then the optimizer 320 selects T1 ⋈ T3 ⋈ T2 for execution. There are many ways the optimizer 320 can learn that the SORT UNIQUE is unneeded. For example, there may be a unique index provided for the jo connection in column T3.z, or the query may include an instruction to perform a unique sort on the connection column T3.z, or a data definition for the table T3 may provide that the column T3.z contains unique values through a unique constraint, or the SELECT statement may explicitly or implicitly return a distinct result set to the user.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

We claim:

1. A method of optimizing a statement for execution, the statement comprising a first element, a second element, and a first connection operator connecting the first element to the second element, the method comprising:

receiving the statement from a statement provider, determining if the first connection operator is a non-commutative connection operator, wherein if the first connection operator is a non-commutative connection operator then identifying a commutative operator that can be used to replace the non-commutative connection operator;

replacing the first connection operator with a second operator, and forwarding the statement for execution;

wherein the first connection operator corresponds to the non-commutative connection operator and the second connection operator corresponds to the commutative connection operator.

2. The method of claim 1, wherein replacing the first connection operator with the second connection operator comprises:

converting the second element into a distinct results element, and connecting the first element and the distinct results element using the second connection operator.

3. The method of claim 2, wherein converting the second element into a distinct results element comprises linking a unique sort operator with the second element.

4. The method of claim 2, wherein converting the second element into a distinct results element comprises linking a distinct results operator with the second element.

5. The method of claim 2, wherein connecting the first element and the distinct results element using the second connection operator comprises connecting the second element to the first element, wherein the second connection operator comprises a left-hand side and a right hand side and the second element appears on the left-hand side of the second connection operator.

6. The method of claim 1, wherein at least one of the elements comprises a subquery, further comprising unnesting the subquery into a flattened statement.

7. The method of claim 1, further comprising connecting the second element to the first element, wherein the second connection operator comprises a left-hand side and a right hand side and the second element appears on the left-hand side of the second connection operator.

8. The method of claim 1, wherein the commutative connection operator comprises a join operator.

9. The method of claim 1, wherein the non-commutative connection operator comprises a semi-join operator.

10. The method of claim 6, wherein the subquery comprises an EXISTS subquery.

11. The method of claim 6, wherein the subquery comprises an IN subquery.

12. The method of claim 6, wherein the subquery comprises an ANY subquery.

13. A system for optimizing a statement, the statement comprising one or more connection conditions, each connection condition connecting a plurality of elements, comprising:
   a statement receiver configured to receive the statement from a user,
   a statement optimizer configured to optimize the statement, the statement optimizer comprising:
      a connection replacer, configured to determine if a first connection operator is a non-commutative connection operator, wherein if the first connection operator is a non-commutative connection operator then identifying a commutative operator that can be used to replace the non-commutative connection operator, in which the connection replacer replaces a non-commutative connection operator in the statement with a commutative connection operator,
      a connection re-orderer, configured to generate a plurality of connection orders, each connection order specifying an order in which the plurality of tables is to be connected, and
   a statement forwarder configured to forward the statement for execution.

14. The system of claim 13, wherein the statement optimizer further comprises a subquery unnester configured to create a flattened statement by unnesting a subquery into a connection condition.

15. The system of claim 13, wherein the statement optimizer further comprises a distinct results element generator, configured to convert an element into a distinct results element.

16. A computer-useable medium, the medium comprising a sequence of instructions which, when executed by the processor, causes the processor to execute a method of optimizing a statement for execution, the statement comprising a first element, a second element, and a first connection operator connecting the first element to the second element, the method comprising:
   receiving the statement from a statement provider,
   determining if the first connection operator is a non-commutative connection operator, wherein if the first connection operator is a non-commutative connection operator then identifying a commutative operator that can be used to replace the non-commutative connection operator;
   replacing the first connection operator with a second connection operator, and
   forwarding the statement for execution;
   wherein the first connection operator corresponds to the non-commutative connection operator and the second connection operator corresponds to the commutative connection operator.

17. The computer-useable medium of claim 16, wherein replacing the first connection operator with the second connection operator comprises:
   converting the second element into a distinct results element, and connecting the first element and the distinct results element using the second connection operator.

18. The computer-useable medium of claim 17, wherein converting the second element into a distinct results element comprises linking a unique sort operator with the second element.

19. The computer-useable medium of claim 17, wherein converting the second element into a distinct results element comprises linking a distinct results operator with the second element.

20. The computer-useable medium of claim 17, wherein connecting the first element and the distinct results element using the second connection operator comprises connecting the second element to the first element, wherein the second connection operator comprises a left-hand side and a right hand side and the second element appears on the left-hand side of the second connection operator.

21. The computer-useable medium of claim 16, wherein at least one of the elements comprises a subquery, further comprising unnesting the subquery into a flattened statement.

22. The computer-useable medium of claim 16, the method further comprising connecting the second element to the first element, wherein the second connection operator comprises a left-hand side and a right hand side and the second element appears on the left-hand side of the second connection operator.

23. The computer-useable medium of claim 16, wherein the commutative connection operator comprises a join operator.

24. The computer-useable medium of claim 16, wherein the non-commutative connection operator comprises a semi-join operator.

25. The computer-useable medium of claim 21, wherein the subquery comprises an EXISTS subquery.

26. The computer-useable medium of claim 21, wherein the subquery comprises an IN subquery.

27. The computer-useable medium of claim 21, wherein the subquery comprises an ANY subquery.

* * * * *

UNITED STATES PATENT AND TRADEMARK OFFICE
CERTIFICATE OF CORRECTION

| | | |
|---|---|---|
| PATENT NO. | : 7,167,852 B1 | Page 1 of 1 |
| APPLICATION NO. | : 10/137102 | |
| DATED | : January 23, 2007 | |
| INVENTOR(S) | : Ahmed et al. | |

It is certified that error appears in the above-identified patent and that said Letters Patent is hereby corrected as shown below:

On face page, in field 56, in column 2, under "Other Publications", line 9, delete "65-113." and insert -- 63-113. --, therefor.

In column 1, line 50, delete ""emp_able":" and insert -- "emp_table": --, therefor.

In column 2, line 30, delete "as" and insert -- as "=" --, therefor.

In column 2, line 44, delete "T1.x T2.x" and insert -- T1.x=T2.x --, therefor.

In column 3, line 65, delete "RE" and insert -- WHERE --, therefor.

In column 9, line 41, delete "(T3.z) T2.z." and insert -- (T3.z)=T2.z. --, therefor.

Signed and Sealed this

Sixteenth Day of March, 2010

David J. Kappos
*Director of the United States Patent and Trademark Office*